(12) United States Patent
Wigmore et al.

(10) Patent No.: US 10,768,848 B2
(45) Date of Patent: Sep. 8, 2020

(54) BACKUP PERFORMANCE IN STORAGE TIERS USING DATA ALLOCATION OPTIMIZATION

(71) Applicant: EMC Corporation, Hopkinton, MA (US)

(72) Inventors: Ian Wigmore, Westborough, MA (US); Stephen D. Smaldone, Woodstock, CT (US); Marik Marshak, Newton, MA (US); Arieh Don, Newton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/754,094

(22) Filed: Jun. 29, 2015

(65) Prior Publication Data
US 2016/0378616 A1     Dec. 29, 2016

(51) Int. Cl.
G06F 3/06      (2006.01)
G06F 11/14     (2006.01)
G06F 11/00     (2006.01)

(52) U.S. Cl.
CPC ............ G06F 3/065 (2013.01); G06F 3/061 (2013.01); G06F 3/0649 (2013.01); G06F 3/0685 (2013.01); G06F 11/00 (2013.01); G06F 11/1435 (2013.01); G06F 11/1461 (2013.01); G06F 11/1466 (2013.01); G06F 11/1469 (2013.01); *G06F 2201/84* (2013.01)

(58) Field of Classification Search
CPC .. G06F 3/065; G06F 11/1435; G06F 11/1469; G06F 2201/84

USPC ......................................................... 711/162
See application file for complete search history.

(56) References Cited

U.S. PATENT DOCUMENTS

| | | | | |
|---|---|---|---|---|
| 8,554,918 B1* | 10/2013 | Douglis | ............. | G06F 11/3485 707/640 |
| 8,566,553 B1* | 10/2013 | Marshak | ............... | G06F 3/0619 711/170 |
| 8,612,284 B1* | 12/2013 | Sharif | .................... | G06F 3/067 705/400 |
| 9,003,157 B1* | 4/2015 | Marshak | ............... | G06F 3/0685 711/170 |
| 9,152,507 B1* | 10/2015 | Bushman | ............ | G06F 11/1469 |
| 2007/0185934 A1* | 8/2007 | Cannon | ............... | G06F 11/1451 |
| 2007/0220219 A1* | 9/2007 | Bansal | ................ | H04L 47/2416 711/159 |
| 2008/0281939 A1* | 11/2008 | Frazier | .............. | G06F 17/30289 709/213 |
| 2010/0115216 A1* | 5/2010 | Jia | ........................ | H04L 67/1097 711/162 |
| 2010/0274983 A1* | 10/2010 | Murphy | .............. | G06F 11/1456 711/162 |
| 2011/0082988 A1* | 4/2011 | Kono | .................... | G06F 3/0605 711/161 |

(Continued)

*Primary Examiner* — William E. Baughman
(74) *Attorney, Agent, or Firm* — Womble Bond Dickinson (US) LLP (57) ABSTRACT

A system for improving backup performance includes an interface, a processor, and a memory. The interface is to receive a volume identifier to backup. The processor is to determine allocation for data of a volume associated with the volume identifier in a plurality of storage tiers to improve backup processing, move data based at least in part on the allocation, and backup data of the volume. The memory is coupled to the processor and configured to provide the processor with instructions.

17 Claims, 7 Drawing Sheets

(56) References Cited

U.S. PATENT DOCUMENTS

| | | | |
|---|---|---|---|
| 2012/0095968 A1* | 4/2012 | Gold | G06F 11/1456 |
| | | | 707/652 |
| 2012/0117029 A1* | 5/2012 | Gold | G06F 11/1451 |
| | | | 707/651 |
| 2012/0173831 A1* | 7/2012 | Rubio | G06F 3/0605 |
| | | | 711/165 |
| 2013/0297872 A1* | 11/2013 | Hyde, II | G06F 3/0611 |
| | | | 711/117 |

* cited by examiner

BACKUP PERFORMANCE IN STORAGE
TIERS USING DATA ALLOCATION
OPTIMIZATION

BACKGROUND OF THE INVENTION

Modern storage arrays place data in a storage performance tier matching its access statistics. The tier level for any given data is determined using monitoring of usage of the data in the tiers over large time intervals. Data frequently accessed is placed in faster tiers whereas data seldom accessed is placed in lower tiers, thus optimizing access times for the data. Monitoring of data usage is performed over large time scales due to typically large data set size and the fact that changes to the data usage frequency occur slowly: hot data is hot for a period of time, and later the data turns cold usually staying cold from then on. However, backup data typically has a different usage profile: a full backup is typically performed weekly overwriting one of the previous copies, with incremental backups occurring during each day the week. During the full backup, the best system performance is required to fit the backup into the ever shrinking window for performing the backup (e.g., given the always on demands placed on today's data systems). However, afterward the backup, the data needed for the backup stays cold until the next backup (e.g., a full or incremental backup).

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for improving backup performance is disclosed. The system comprises an interface, a processor, and a memory. The interface is to receive a volume identifier to backup. The processor is to determine allocation for data of a volume associated with the volume identifier in a plurality of storage tiers to improve backup processing. The processor is to move data based at least in part on the allocation. The processor is to backup data of the volume. The memory is coupled to the processor and configured to provide the processor with instructions.

In some embodiments, data is placed in a storage performance tier based at least in part on the frequency of access—the most often accessed files are placed in a top tier with the fastest access (e.g., in a tier with solid state memories—for example, flash, Random Access Memory (RAM), an enterprise flash drive (EFD), etc.), whereas files accessed occasionally accessed are placed in a middle tier with medium access (e.g., a fast drive, a fiber channel drive, etc.), a seldom accessed file is placed on a low tier (e.g., with a slow drive, a serial advanced technology attachment (SATA) drive, integrated drive electronics (IDE) drive, a deduplication drive, etc.), and an almost never accessed file in a remote tier (e.g., an off-site storage, a cloud storage, etc.). In various embodiments, the storage system includes many tiers of memories each tier having different access characteristic. In some embodiments, the tiers are ranked fastest to slowest.

In some embodiments, backup data typically has a different access profile. For example, a full backup has a periodic spike in accessing all data, whereas an incremental backup has a different periodic spike in accessing all changed data. Full and incremental backups need to perform in a time window so as not to impact system performance. To run the fastest, all data to be backed up would be located in the fastest tier during backup, and then right after the backup return to the tier as indicated based on the normal operational access profile.

In some embodiments, allocation of data of a volume is determined to improve backup processing. The unoccupied areas of each tier are determined. A costing is determined regarding moving any given data to a tier different from its current tier and the impact the move has on the performance of the backup. The cost is used to determine an allocation for a given backup. For example, for a full backup, the allocation indicates that all data be moved to the highest performance tier. In some embodiments, the data is put in a series of tiers based on how much will fit in the tiers (e.g., as much as is possible in the highest tier, as much as is possible in the next highest tier, etc. until as much data as possible has been raised to higher tiers). In some embodiments, after backup, the system determines a second allocation. For example, the second allocation returns the data to the tiers from where it came from prior to moving to higher tiers (e.g., the system recalls the location of each data and returns the data to the tier from which it originated). In some embodiments, the second allocation recalculates according to the access history a storage tier appropriate for a given data.

In various embodiments, the allocation is based at least in part on one or more of the following: the percentage of data changed, the time remaining until incremental backup start, the time remaining until full backup start, the number of storage tiers, the performance information of each of the storage tier, the time of moving data between tiers, the system load of moving data between tiers, the current tier of each data, or any other appropriate parameter for determining allocation. In some embodiments, it is not known which data of the volume to be backed up has changed. In some embodiments, on an incremental backup at the time of the calculation of the allocation, the blocks that are changed are not known so an assumption is made as to the percentage of blocks changed based at least in part on previous percentage of blocks changed as determined during the previous backups. In some embodiments, the success of the allocation—for example, the actual backup time is compared to an estimated backup time for data without moving to the allocation—is fed back to improve the performance of the cost function and the allocation algorithm.

Figure 1:
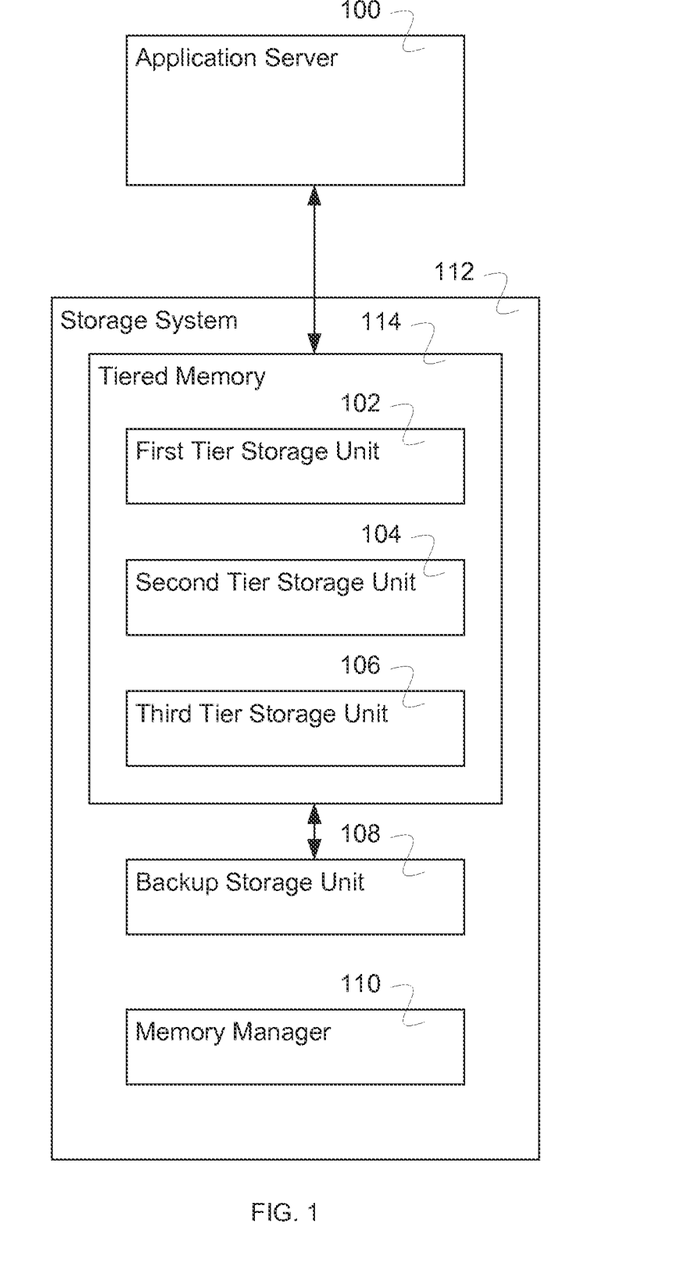
FIG. 1 is a diagram illustrating an embodiment of a system for improving backup performance.

FIG. 1 is a diagram illustrating an embodiment of a system for improving backup performance. In the example shown, application server 100 is able to communicate with storage system 112. In some embodiments, application server 100 runs applications that request to access data stored in storage system 112. Storage system 112 comprises tiered memory 114 that includes a number of tiers of memory, where each tier has different performance characteristics. Tiered memory 114 includes first tier storage unit 102, second tier storage unit 104, and third tier storage unit 106. Storage system 112 comprises backup storage unit 108 and memory manager 110. Backup storage unit 108 backs up tiered memory 114. In some embodiments, backup storage unit 108 comprises a deduplicating backup storage unit that segments data to be backed up and stores references to segments previously stored when storing a new set of segments in the event that the new segment is identical to a previously stored segment. Memory manager 110 tracks locations of data—for example, the tier location of each data—and manages data locations to optimize performance including memory access performance during operations and during backups.

Figure 2:
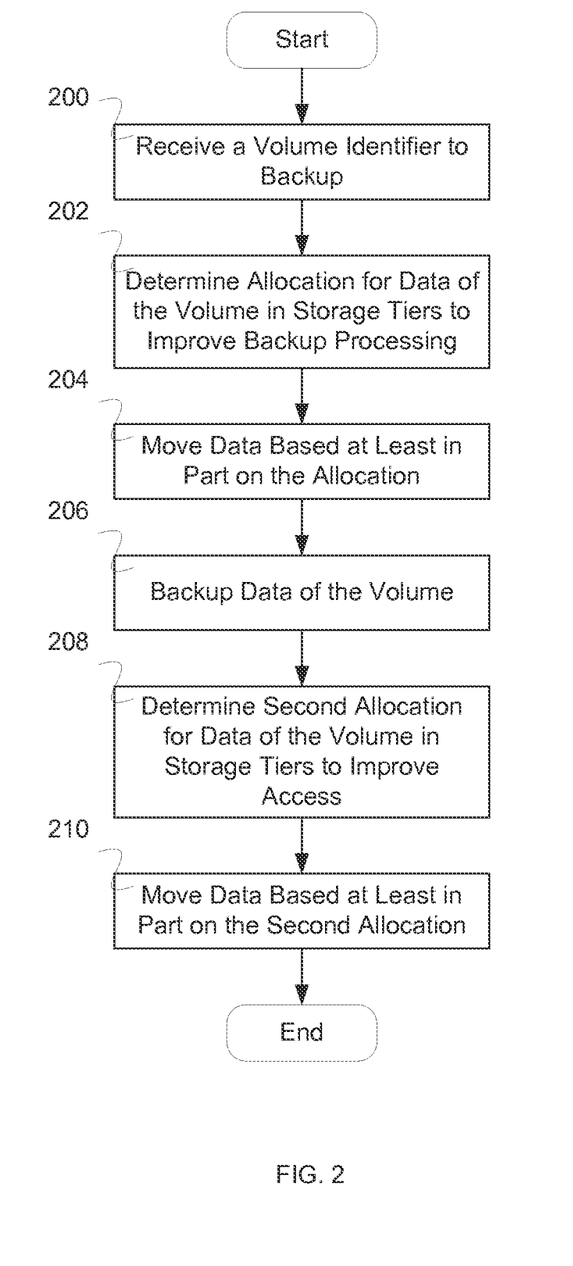
FIG. 2 is a flow diagram illustrating an embodiment of a process for improving backup performance.

FIG. 2 is a flow diagram illustrating an embodiment of a process for improving backup performance. In some embodiments, the process of FIG. 2 is implemented by storage system 112 of FIG. 1. In some embodiments, the process of FIG. 2 is implemented by memory manager 110 of FIG. 1. In the example shown, in 200 a volume identifier to backup is received. In 202, an allocation for data of the volume in storage tiers is determined to improve backup processing. In 204, data is moved based at least in part on the allocation. In 206, the data of the volume is backed up. In 208, a second allocation for data of the volume is determined in storage tiers to improve access. In 210, the data is moved based at least in part on the second allocation.

Figure 3:
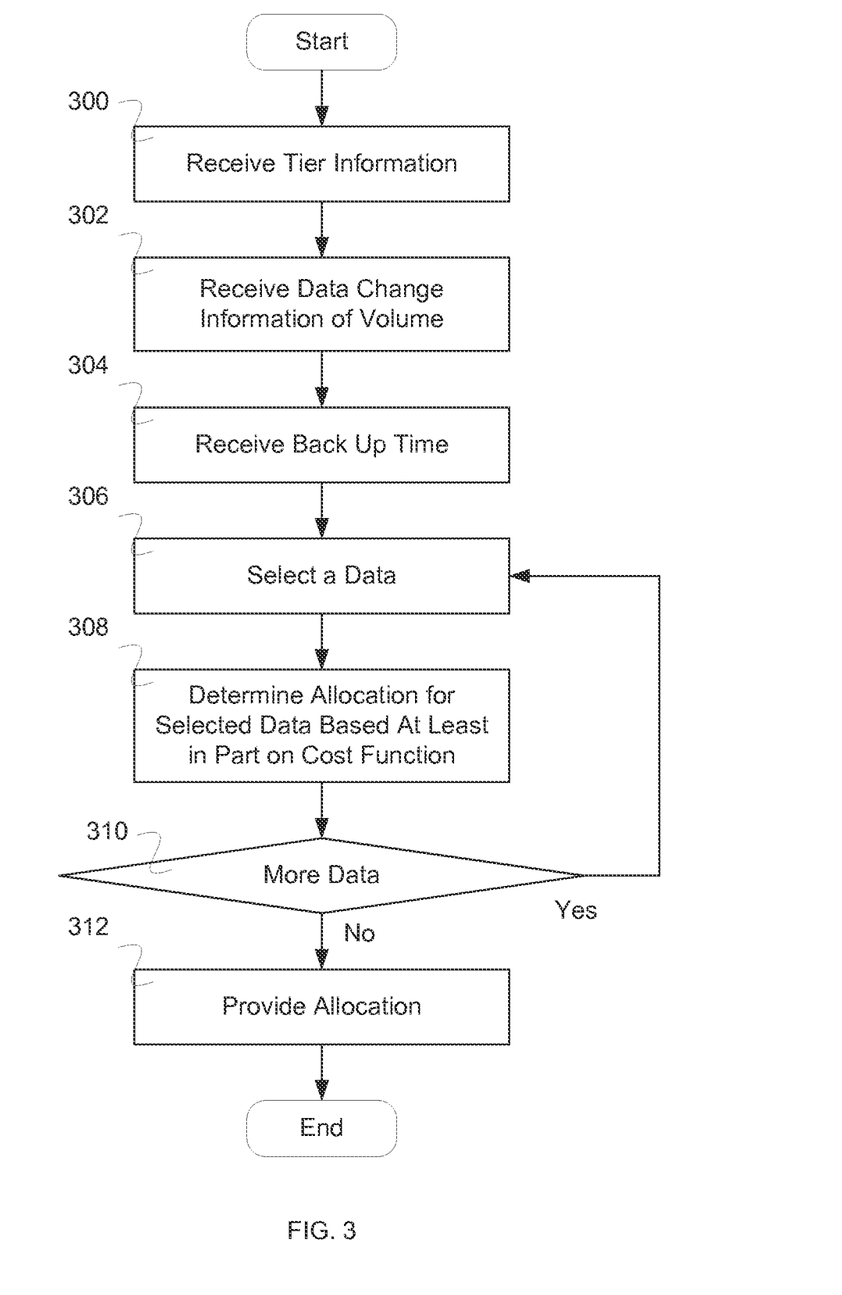
FIG. 3 is a flow diagram illustrating an embodiment of a process for determining allocation.

FIG. 3 is a flow diagram illustrating an embodiment of a process for determining allocation. In some embodiments, the process of FIG. 3 is used to implement 202 of FIG. 2. In the example shown, in 300 tier information is received. In 302, data change information of volume is received. In various embodiments, data change information is known prior to backup as measured using a process that determines changed blocks or data, data change information is known as estimated based at least in part on prior determined changed blocks or data, or any other appropriate source of data change information. In 304, backup time is received. In 306, a data is selected. In 308, an allocation for selected data is determined based at least in part on a cost function. In 310, it is determined whether there is more data. In the event that there is more data, control passes to 306. In the event that there is no more data, in 312 an allocation is provided.

Figure 4A:
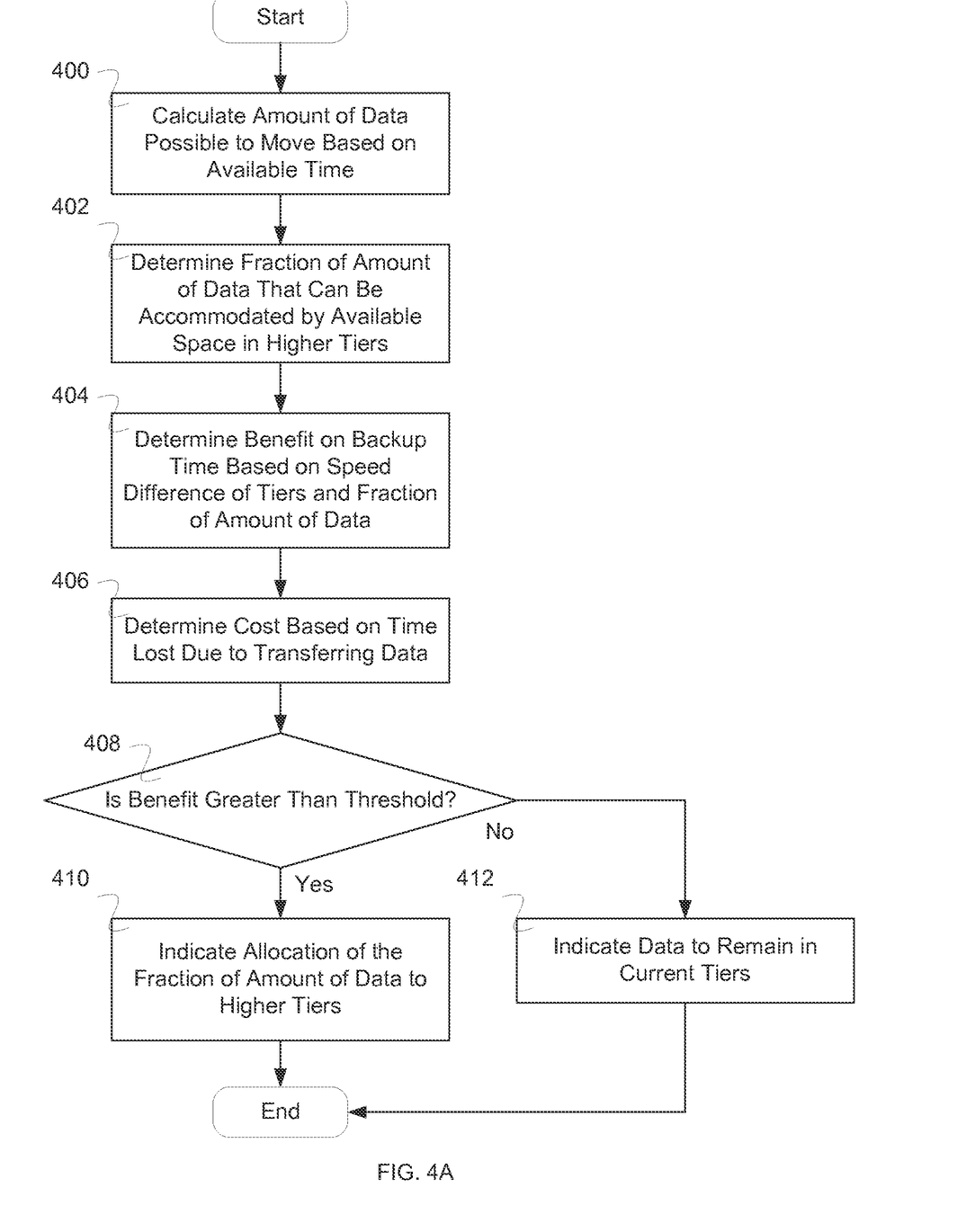
FIG. 4A is a flow diagram illustrating an embodiment of process for determining allocation.

FIG. 4A is a flow diagram illustrating an embodiment of process for determining allocation. In some embodiments, the process of FIG. 4A is used to implement 308 of FIG. 3. In the example shown, in 400 amount of data possible to move is calculated based on available time. For example, the amount of time to next backup and bandwidth available to move data between tiers is used to determine amount of data that can be moved from existing tiers to higher tiers. In 402, fraction of amount of data that can be accommodated by available space in higher tiers is determined. For example, the available space in higher tiers from current data is used to determine the fraction of amount of data possible to move that can fit in higher tiers. In 404, the benefit is determined on backup time based on speed difference of tiers and fraction of amount of data. For example, based on the data that can be moved and the tiers that the data is moved to, a difference in time is determined for a backup time. In 406, a cost is determined based on the time lost due to transferring data. For example, the processing cost is determined for moving the data and the impact this has on other processes. In 408, it is determined whether the benefit is greater than a threshold. For example, the threshold is based on the cost and/or on a client selection and is compared to the benefit (e.g., a benefit of N (e.g., 200) minutes is greater than a threshold of M (e.g., 40) minutes that is based at least in part on a cost of L (e.g., 20) minutes and a minimum benefit of K (e.g., 20) minutes (as selected by a user) above the cost). In the event that the benefit is greater than a threshold, in 410 an allocation of the fraction of amount of data is indicated of data to higher tiers, and the process ends. For example, the data to be moved from lower tiers to higher tiers is indicated as an allocation. In the event that the benefit is not greater than a threshold, in 412 it is indicated that the data is to remain in current tiers, and the process ends. For example, the allocation of data is the same and no data is to be moved to improve backup performance.

In some embodiments, a cost function and/or a benefit function are used to determine an allocation. For example, the cost and/or benefit function indicates an impact increasing time and/or decreasing time of processing for backup and/or other processes. In some embodiments, determining allocation comprises one or more of the following: determining available storage in a plurality of storage tiers. In various embodiments, determining allocation is based at least in part on one or more of the following: percentage of data that has changed in the volume, time remaining until backup, number of storage tiers, performance of each of the plurality of storage tiers, or any other input information. In some embodiments, determining allocation comprises determining a cost function, determining a benefit function, or any other appropriate function. In some embodiments, the cost function includes a cost of moving data between a tier and a second tier. In some embodiments, the cost of moving data is based at least in part on one or more of the following: a moving time (e.g., moving time for moving data), a system load, a bandwidth limit for moving, or any other appropriate factor. In some embodiments, the cost function is based at least in part on a current storage tier of the data. In some embodiments, a benefit and cost are combined in one equation using appropriate weights and/or signs. In some embodiments, a cost function includes a benefit amount.

In some embodiments, a cost function comprises factors with weights assigned to each where the weights are changing over time with knowledge gained from previous backups. In various embodiments, the factors include the percentage of data changed since last backup, the time to next backup, the bandwidth between storage tiers, the available space in each tier, the time for transferring data between the tiers, the savings in backup time from moving the data to faster tiers, or any other appropriate factor.

Figure 4B:
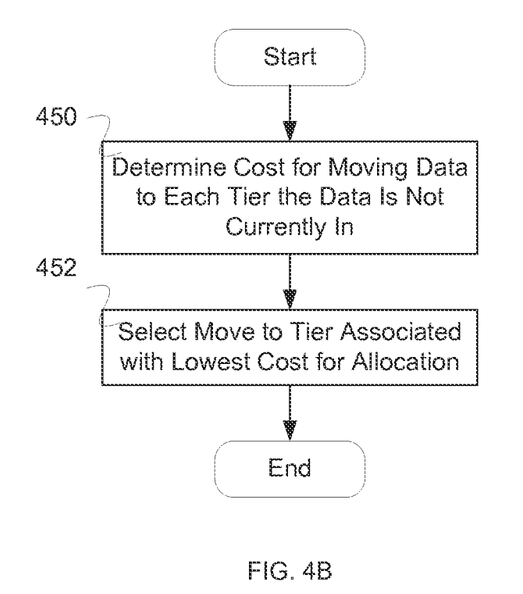
FIG. 4B is a flow diagram illustrating an embodiment of a process for determining the allocation based on cost function.

FIG. 4B is a flow diagram illustrating an embodiment of a process for determining the allocation based on cost function. In some embodiments, the process of FIG. 4 is used to implement 308 of FIG. 3. In the example shown, in 450 cost for moving data is determined to each tier the data is not currently in. In 452, a move is selected to tier associated with lowest cost for allocation.

In some embodiments, the plurality of storage tiers includes a slower storage tier and a faster storage tier (e.g., access time and/or transfer time to and/or from the slower storage tier is slower than the faster tier). In some embodiments, the allocation indicates to move data from the slower storage tier to the faster storage tier or moving data from the faster storage tier to the slower storage tier.

Figure 5:
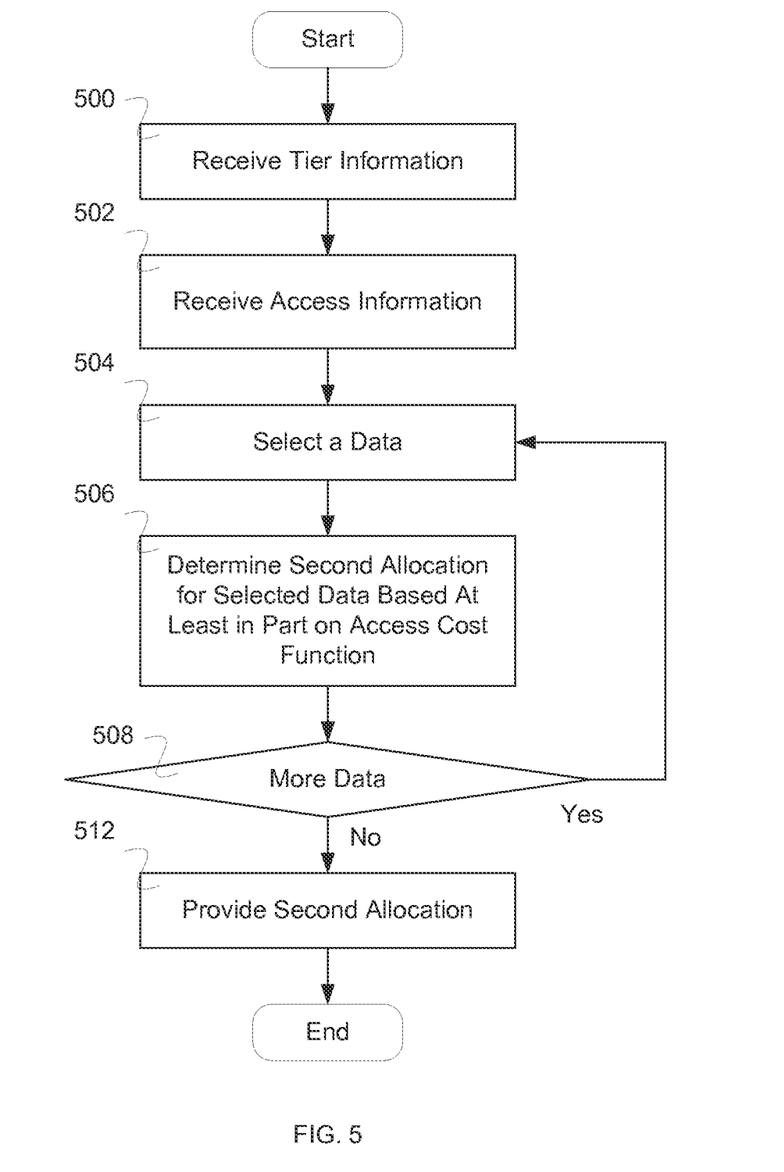
FIG. 5 is flow diagram illustrating an embodiment of a process for determining the second allocation based on cost function.

FIG. 5 is flow diagram illustrating an embodiment of a process for determining the second allocation based on cost function. In some embodiments, the process of FIG. 5 is used to implement 208 of FIG. 2. In the example shown, in 500 tier information is received. In 502, access information is received. In 504, a data is selected. In 506, a second allocation for selected data is determined based at least in part on a cost function. In 508, it is determined whether there is more data. In the event that there is more data, control passes to 504. In the event that there is no more data, in 512 a second allocation is provided.

Figure 6:
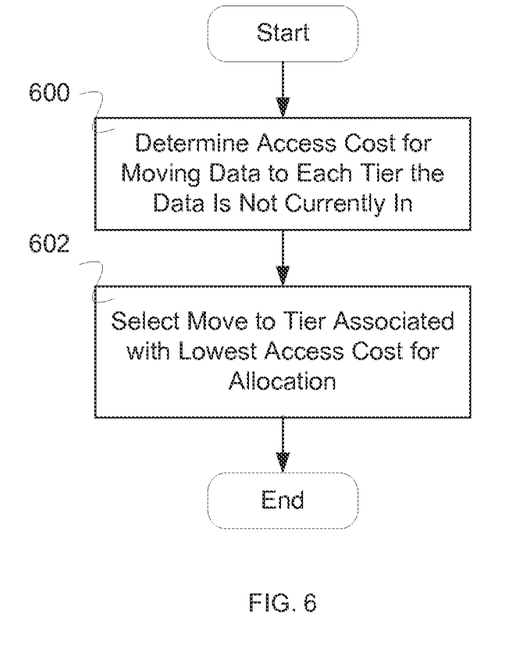
FIG. 6 is a flow diagram illustrating an embodiment of a process for determining the allocation based on cost function.

FIG. 6 is a flow diagram illustrating an embodiment of a process for determining the allocation based on cost function. In some embodiments, the process of FIG. 6 is used to implement 506 of FIG. 5. In the example shown, in 600 access cost for moving data is determined to each tier the data is not currently in. In 602, a move is selected to tier associated with lowest access cost for allocation.

In some embodiments, the second allocation is for after backing up the data of the volume. In some embodiments, data is moved according to the second allocation after backing up the data volume. In some embodiments, the second allocation is based at least in part on optimizing access to data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for improving backup performance comprising:
   an interface to:
     receive a volume identifier to backup;
   a processor to:
     determine a first allocation for backup for data of a volume associated with the volume identifier in a plurality of storage tiers, comprising:
       determining a plurality of storage tiers with capacity to store the data,
       for each storage tier of the plurality of storage tiers with capacity to store the data other than a current storage tier:
         determining a benefit in backup time based on a speed difference between the current storage tier and each storage tier and a maximum possible amount of data that can be moved within available time, the maximum possible amount of data that can be moved being determined based on an amount of time remaining until a next backup and a bandwidth available to move data between tiers, and
         determining a cost based on time lost due to moving the data between the current storage tier and each storage tier using a cost function;
       determining the first allocation, wherein the first allocation is associated with a highest benefit in backup time to cost ratio;
     move the data based on the determined first allocation to improve backup processing;
     in response to moving the data based on the determined first allocation, back up the data of the volume;
     modify the cost function based on a success of the first allocation for data of the volume for determining a subsequent first allocation;
     determine a second allocation for normal operational access different from the first allocation for the data of the volume;
     subsequent to the moving of the data based on the determined first allocation and the backing up, move the data based on the determined second allocation to optimize access to the data; and
   a memory coupled to the processor and configured to provide the processor with instructions.

2. The system as in claim 1, wherein determining the first allocation comprises determining available storage in a plurality of storage tiers.

3. The system as in claim 1, wherein determining the first allocation is based at least in part on percentage of data that has changed in the volume.

4. The system as in claim 1, wherein determining the first allocation is based at least in part on a number of storage tiers.

5. The system as in claim 1, wherein determining the first allocation is based at least in part on performance of each of the plurality of storage tiers.

6. The system as in claim 1, wherein determining the first allocation comprises determining the cost function.

7. The system as in claim 6, wherein the cost function includes a cost of moving data between a first tier and a second tier.

8. The system as in claim 7, wherein the cost of moving data is based at least in part on a moving time.

9. The system as in claim 7, wherein the cost of moving data is based at least in part on a system load.

10. The system as in claim 7, wherein the cost of moving is based at least in part on a bandwidth limit for moving.

11. The system as in claim 6, wherein the cost function is based at least in part on the current storage tier of the data.

12. The system as in claim 1, wherein the plurality of storage tiers includes a slower storage tier and a faster storage tier.

13. The system as in claim 12, further comprising moving data from the slower storage tier to the faster storage tier.

14. The system as in claim 12, further comprising moving data from the faster storage tier to the slower storage tier.

15. The system as in claim 1 wherein the processor modifies the cost function by modifying one or more weights of one or more weight factors of the cost function, wherein the weights are adjusted over time based on information of one or more backups, and wherein the one or more weight factors comprise one or more of: a percentage of data changed since last backup, a time to next backup, a bandwidth between storage tiers, an available space in each tier, a time for transferring data between the tiers, or savings in backup time from moving the data to faster tiers.

16. A method of improving backup performance, comprising:
 receiving a volume identifier to backup;
 determining, using a processor, a first allocation for backup for data of a volume associated with the volume identifier in a plurality of storage tiers, comprising:
  determining at least one higher storage tier with capacity to store the data,
  for each storage tier of the plurality of storage tiers with capacity to store the data other than a current storage tier:
   determining a benefit in backup time based on a speed difference between the current storage tier and each storage tier and a maximum possible amount of data that can be moved within available time, the maximum possible amount of data that can be moved being determined based on an amount of time remaining until a next backup and a bandwidth available to move data between tiers, and
   determining a cost based on time lost due to moving the data between the current storage tier and each storage tier using a cost function;
  determining the first allocation, wherein the first allocation is associated with a highest benefit in backup time to cost ratio;
 moving the data based on the determined first allocation to improve backup processing;
 in response to moving the data based on the determined first allocation, backing up the data of the volume;
 modifying the cost function based on a success of the first allocation for data of the volume for determining a subsequent first allocation;
 determining a second allocation for normal operational access different from the first allocation for the data of the volume; and
 subsequent to the moving of the data based on the determined first allocation and the backing up, moving the data based on the determined second allocation to optimize access to data.

17. A computer program product for improving backup performance, the computer program product being embodied in a non-transitory computer readable storage medium and comprising computer instructions for:
 receiving a volume identifier to backup;
 determining, using a processor, a first allocation for backup for data of a volume associated with the volume identifier in a plurality of storage tiers, comprising:
  determining at least one higher storage tier with capacity to store the data,
  for each storage tier of the plurality of storage tiers with capacity to store the data other than a current storage tier:
   determining a benefit in backup time based on a speed difference between the current storage tier and each storage tier and a maximum possible amount of data that can be moved within available time, the maximum possible amount of data that can be moved being determined based on an amount of time remaining until a next backup and a bandwidth available to move data between tiers, and
   determining a cost based on time lost due to moving the data between the current storage tier and each storage tier using a cost function;
  determining the first allocation, wherein the first allocation is associated with a highest benefit in backup time to cost ratio;
 moving the data based on the first allocation to improve backup processing;
 in response to moving the data based on the determined first allocation, backing up the data of the volume;
 modifying the cost function based on a success of the first allocation for data of the volume for determining a subsequent first allocation;
 determining a second allocation for normal operational access different from the first allocation for the data of the volume; and
 subsequent to the moving of the data based on the determined first allocation and the backing up, moving the data based on the determined second allocation to optimize access to data.

\* \* \* \* \*